Figure 1:
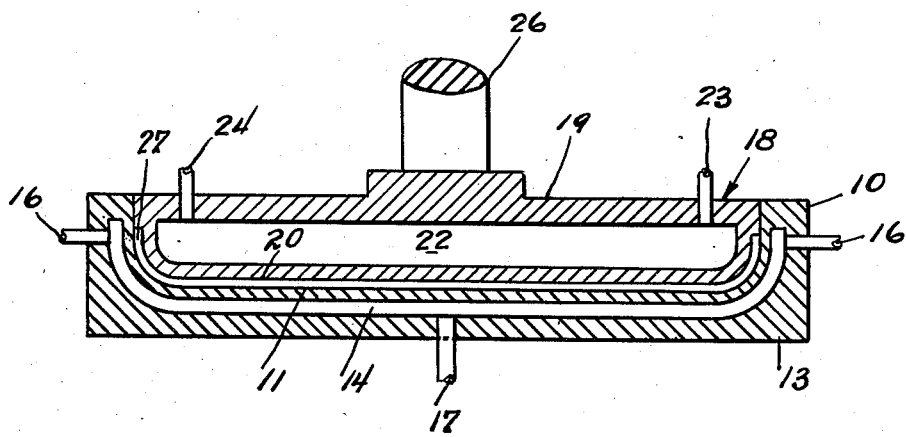

Oct. 24, 1950     R. P. ARNDT     2,527,387
METHOD OF FORMING HOLLOW CAST ARTICLES HAVING SMOOTH
OUTER SURFACES FROM THERMOSETTING RESINS
Filed April 2, 1948

INVENTOR
RUDOLPH P. ARNDT

BY Olen E. Bee
ATTORNEY.

Patented Oct. 24, 1950

2,527,387

UNITED STATES PATENT OFFICE 2,527,387

METHOD OF FORMING HOLLOW CAST ARTICLES HAVING SMOOTH OUTER SURFACES FROM THERMOSETTING RESINS

Rudolph P. Arndt, Milwaukee, Wis., assignor to Pittsburgh Plate Glass Company, a corporation of Pennsylvania Application April 2, 1948, Serial No. 18,564

7 Claims. (Cl. 18—58)

1

The present invention relates to the controlling of the surface texture of resinous articles formed by the molding and curing of resins of the thermosetting type and it has particular relation to the controlling of the surface texture of articles formed of resins which are copolymers of (A) polyesters of unsaturated dicarboxylic acids and dihydric alcohols and (B) olefinically unsaturated polymerizable monomers.

One object of the invention is to provide a method whereby the wrinking of the surfaces of thermosetting resins can be controlled at will so that a desired surface can be maintained in smooth unwrinkled condition exactly duplicating the surface of the mold in which the article is formed.

A second object of the invention is to provide a method of the foregoing type which is simple in its nature and efficient and economical to operate.

These and other objects of the invention will be apparent from consideration of the following specification and claims.

In the molding and casting of articles from thermosetting resins and particularly those thermoset resins obtained by addendum copolymerization of olefinically unsaturated monomers such as styrene and unsaturated polyesters of the alkyd type obtained by esterification of dihydric alcohols such as propylene glycol, diethylene glycol or polyethylene glycol and ethylenically unsaturated dicarboxylic acids such as maleic acid or fumaric acid, there is a strong tendency of one surface of the article to wrinkle or otherwise to assume a rugose character during the course of the molding operation. In most instances the roughened surface was an exterior surface which was likely to be exposed to observation to a maximum degree in the use of the molded articles.

The present invention contemplates a simple and convenient method whereby at least one of the surfaces of articles formed from resins of the thermosetting type can be maintained in a smooth unwrinkled state exactly duplicating the mold surface in appearance and the surface which is to be smooth and unwrinkled can be selected at will by the operator regardless of the normal tendency of the surfaces to wrinkle. These desired results, in accordance with the provisions of the present invention, are obtained by control of the relative temperature of the various portions of the molds. The surface which is to be maintained exactly corresponding in appearance to the surface of the mold, is maintained at a substantially higher temperature than the remaining portions

2 of the mold corresponding to surfaces which are not critical and in which a reasonable degree of roughness is permissible or less objectionable than in the surface in which it is desired to maintain smooth.

An elementary or simplified embodiment of apparatus suitable for use in the practice of the invention is illustrated in section in Fig. 1 of the drawings.

Figure 2:
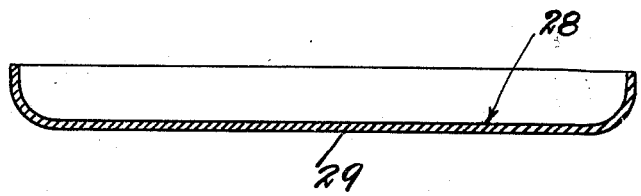

A molded article is illustrated in section in Fig. 2.

The apparatus as shown comprises a mold comprising a female section 10 which may constitute the platten or be supported upon the platten of a conventional hydraulic press (not shown). The section 10 will comprise inner walls 11 and outer walls 13 between which is a space 14 constituting a chamber to which steam, hot water or other heating fluid may be introduced by means of one or more conduits 16 appropriately arranged. The spent heating fluid may be drawn off as indicated at 17, for example at the middle of the bottom portion of the mold section. Obviously any number of outlets 17 may be provided and they may be disposed in any desired position in order to obtain the desired efficiency in the heating operation.

The upper or male section 18 of the mold also includes walls 19 and 20 and a chamber 22 to which heating fluid may be introduced by means of conduit 23 and from which the spent fluid may be withdrawn, for example at 24. One of the mold sections preferably is designed for reciprocation in order to admit of opening and closing of the mold. Such function may be conveniently performed by means of a piston rod 26 operated in any convenient manner, for example by compression fluid in a cylinder (not shown). The inner surface of the female section 13 or the outer surfaces of the male section 18 is appropriately configured to provide a space 27 between the mold sections exactly corresponding to the shape of the articles to be formed. In the drawings, the space is indicated as being tray like in outline or section but obviously any other appropriate section corresponding to that of an article to be formed may be employed.

It will be assumed that it is desired to obtain an article such as a tray or panel 28 (shown in Fig. 2 of the drawings) having a smooth outer surface indicated at 29 exactly corresponding in appearance to the surface of the female section of the mold. The mold chamber 27 is approximately charged with a thermosetting composition such as a mixture of a polyester of an alpha-beta dicarboxylic acid, e. g. maleic or fumaric acid and a glycol together with a polymerizable olefinically unsaturated monomer such as styrene. The composition may also include pulverulent or fibrous fillers, fibrous mats or fabrics and the like. The mold sections are then closed by operation of the piston 26 and a heating medium such as steam, admitted to chambers 14 and 22. If the outer surface of the article is to be maintained in a smooth state corresponding to that of the female section of the mold, a substantial differential of temperature is maintained between the mold sections by suitably controlling the pressures of the steam in the two sections. For example, the outer or female section of the mold is maintained at a temperature of 20 or 40° above that of the inner section. The articles when so cured will have a very smooth wrinkle-free exterior surface. The inner surface, however, may be somewhat wrinkled. Usually this surface is so selected that any rugosity is not particularly objectionable.

It is contemplated that the principles of the invention may be applied to the molding of various thermosetting compositions. For example, it may be applied to the molding of urea-formaldehyde resins. It may also be applied to the molding or casting of phenol-formaldehyde compositions and to others of similar nature. Particularly desirable results are obtained by the employment of copolymerizable mixtures of olefinically unsaturated monomer such as styrene and alkyd type polyesters of glycol such as propylene glycol, diethylene glycol or polyethylene glycol and dicarboxylic acids at least a part of which are unsaturated, e. g. fumaric or maleic. The preparation of copolymerizable mixtures of olefinically unsaturated monomer and unsaturated polyesters is now a fairly well understood art. Numerous compositions of the type are disclosed in the prior art such as U. S. Patents 2,255,313, 2,308,495 and 2,409,633. Theoretical discussions of copolymers of this type are contained in an article by John B. Rust, "Industrial and Engineering Chemistry," vol. 31, #1, page 64. The present invention contemplates the use of compositions of this type broadly.

Specific examples of compositions which may be employed under the provisions of the present invention include various monomers such as styrene, alpha methyl styrene, diallyl phthalate, divinyl benzene and others.

The polyester component may include such polyesters as those of ethylene glycol, diethylene glycol, triethylene glycol, polyethylene glycol of a molecular weight up to 1,000 or 2,000 and dicarboxylic acids. Some of the dicarboxylic acids must be unsaturated and preferably is alpha,beta ethylenically unsaturated. In most instances it will be alpha,beta dicarboxylic. The dicarboxylic acid may be at least in part of the saturated or functionally saturated type. Such saturated acids including phthalic acid, succinic acid, adipic acid, sebacic acid, azelaic acid and the like. The proportion of the saturated acid may be 2, 3, or even 4 mols per mol of the unsaturated acid. The products containing such saturated acids tend to become more flexible as the proportion of the saturated acid is increased and the number of points of unsaturation in the polyester molecule decrease. The glycolic components preferably will be molar or slightly in excess of molar, e. g. 10 to 20 mol percent in excess of the total of the dicarboxylic acids.

These copolymerizable mixtures as is well understood in the art, usually require the presence of a catalyst of addition reaction in order to accelerate the rate of curing. Suitable catalysts are of the peroxide type such as lauroyl peroxide, tertiary butyl peroxide or hydroperoxide, benzoyl peroxide and others.

Gelation catalysts may also be included in the copolymerizable mixtures. Such catalysts include thioglycolic acid or its homologues and derivatives, and vulcanization accelerators and antioxidants of the type resulting from the condensation of aldehydes such as formaldehyde, butyraldehyde, heptaldehyde and amines such as aniline and benzyl amine, and various others. These condensation products are described and discussed in considerable detail in the textbook "The Chemistry of Synthetic Resins," Carlton Ellis, copyrighted 1935, Rheinholdt Publishing Company, vol. 1, page 704 et sequa.

Appropriate fillers such as titanium dioxide, whiting, carbon black, wood flour, cotton flock, asbestos fibers, glass fibers, and the like may be incorporated with the polymerizable mixtures. An appropriate composition for use in the practice of the invention may comprise mixtures within the following ranges of proportions:

| | Parts by weight |
|---|---|
| I. Polyester | 50 to 90 |
| II. Polymerizable olefinically unsaturated monomer | 50 to 10 |
| III. Peroxide type catalyst | .1 to 5 |
| IV. Polymerization inhibitors | 0.001 to 0.1 |

If a gelation catalyst is included, it will be employed within a proportion of about .001 to 1 part by weight. Fillers if employed will usually be within a range of 5 to 100 parts.

The following examples illustrate the application of the principles of the invention.

Example I

A composition of the following ingredients was prepared:

| | Parts by weight |
|---|---|
| Polyester + monomer + inhibitors | 80.3 |
| Benzoyl peroxide | 0.6 |
| Titanium dioxide | 10 to 100 |

The polyester in the example included the ester of equal mols of phthalic acid and fumaric or maleic acid and propylene glycol. The monomer was styrene. The mixture was appropriately mixed together in a ball mill. The benzoyl peroxide was dissolved in the pigmented resin just before being used. This mixture was charged into a metal mold such as above described and the two sections of the mold were closed and then heated. The male section being maintained at 190° F. and the female section at 220° F.

If desired, after the female section has been appropriately charged with the copolymerizable mixture of the composition described, a sheet of the fibrous composition such as a sheet of cotton saturating paper may be placed over the section and the mold then closed. The composition described will be cured within a period of five minutes. Longer periods of time could be employed but usually are not necessary. In some instances where very rapid curing compositions are employed, shorter periods of cure might also be permissible.

It will be understood that a plurality of sheets of paper might be introduced into the mold. Also it will be understood that sheets of cotton cloth or glass fibers or other sheets could be substituted for cotton saturating paper.

Example II

In accordance with the provisions of this example, a composition was made up as follows:

| | Parts by weight |
|---|---|
| Polyester+monomer+inhibitors | 94.6 |
| Tertiary butyl hydroperoxide | 0.4 |
| Cotton flock | 5.0 |

In this example the polyester component again comprised the product of esterification of propylene glycol and mixtures of equal mols of phthalic acid and maleic or fumaric acid. The monomer was styrene. This composition was molded by the procedure above outlined in connection with Example I except that no sheet of paper or cloth or other material was used.

It will be appreciated that the permissible minimum differential of temperature between the mold sections will vary to a considerable degree dependent upon the rate of cure of the resins. If rapidly curing compositions are employed, lower differentials may be admitted. 20 or 30° seems to be about the minimum for most compositions. Considerable excesses are admissible. The maximum temperature of cure should be selected at a value which will not produce excessive decomposition or discoloration of the resins or the fillers contained therein. In general, temperatures up to 200 of 350° F. are contemplated as permissible for different types of composition.

It will be apparent to those skilled in the art that numerous modifications may be made without departure from the spirit of the invention or the scope of the appended claims.

I claim:

1. In a method of forming a hollow, cast article of thermosetting resins in a mold comprising a male section and a female section, said articles having smooth outer surfaces, the steps of charging the female section of a mold with a copolymerizable mixture of (A) 10 to 50 parts by weight of styrene and (B) 50 to 90 parts by weight of a polyester of (1) a glycol of a class consisting of propylene glycol and an ether of ethylene glycol containing 2 hydroxyl groups, (2) a dicarboxylic acid of a class consisting of saturated aliphatic dicarboxylic acids and phthalic acid and (3) an alpha-beta dicarboxylic, alpha-beta ethylenically unsaturated acid, there being at least 1 mole of the latter acid per 2 to 4 moles of the first mentioned acid, said mixture being adapted to be polymerized to hard infusible state, inserting a male section in the mold and heating both sections simultaneously to the curing temperature of the mixture, the female section being heated to a temperature 20 to 40 F. higher than the male section.

2. The steps as defined in claim 1 in which the male mold section is at 190 F. and the female section is at 220° F.

3. The steps as defined in claim 2 in which the alpha beta dicarboxylic, alpha beta ethylenically unsaturated acid of the polyester is maleic acid.

4. The steps as defined in claim 2 in which the alpha beta dicarboxylic, alpha beta ethylenically unsaturated acid of the polyester is fumaric acid.

5. The steps as defined in claim 1 in which the mixture to be cast is in non-gelled state.

6. In a method of forming hollow cast articles of a thermosetting resin in a mold comprising a male section and a female section, said articles having smooth outer surfaces, the steps of charging the female section of a mold with a mixture of (A) 10 to 50 parts by weight of styrene and (B) 50 to 90 parts by weight of a polyester of (1) a glycol of a class consisting of propylene glycol and an ether of ethylene glycol, said ether containing 2 hydroxyl groups, and (2) a dicarboxylic acid of a class consisting of saturated aliphatic dicarboxylic acid and phthalic acid and (3) an alpha-beta dicarboxylic alpha-beta ethylenically unsaturated acid, said mixture being adapted to be polymerized to hard, infusible state, inserting a male section in the mold and heating both sections simultaneously to the curing temperature of the mixture, the female section being heated to a temperature of 20 to 40° F. higher than the male section.

7. In a method of forming a hollow cast article having smooth, wrinkle free outer surfaces of liquid, thermosetting, resinifiable composition in a mold comprising male and female sections, the steps of charging a liquid resinifiable mixture which is adapted rapidly to cure to a hard thermoset state when heated, into the female section, inserting the male section to form a mold chamber of desired configuration, heating the sections to a temperature sufficient rapidly to cure the composition to hard thermoset state, the female section being heated to a temperature 20 to 40 F. higher than the male section, maintaining the temperature until the composition is hardened and removing the resultant cast articles.

RUDOLPH P. ARNDT.

REFERENCES CITED

The following references are of record in the file of this patent:

UNITED STATES PATENTS

| Number | Name | Date |
|---|---|---|
| 1,524,335 | Brown | Jan. 27, 1925 |
| 1,627,209 | Smith | May 3, 1927 |
| 1,960,717 | Smith | May 29, 1934 |
| 2,305,433 | Kyle | Dec. 15, 1942 |

FOREIGN PATENTS

| Number | Country | Date |
|---|---|---|
| 540,169 | Great Britain | Oct. 8, 1941 |